United States Patent
Davies et al.

[19]

[11] Patent Number: 5,995,391
[45] Date of Patent: Nov. 30, 1999

[54] CONTROL ARRANGEMENT FOR A MULTILEVEL CONVERTOR

[75] Inventors: Mark Davies, Little Haywood; Philip J Fitz, Weston; Keith Abbott, Gnosall, all of United Kingdom

[73] Assignee: GEC Alsthom Limited, United Kingdom

[21] Appl. No.: 08/829,714

[22] Filed: Mar. 31, 1997

[30] Foreign Application Priority Data

Apr. 19, 1996 [GB] United Kingdom ............... 9608097

[51] Int. Cl.$^6$ ............... H02M 1/12; H02M 5/00; G05F 1/00; G05F 1/10
[52] U.S. Cl. ............... 363/43; 363/149; 323/217; 323/243
[58] Field of Search ............... 363/65, 129, 43, 363/148, 149; 323/24, 212, 217, 242, 243, 237

[56] References Cited

U.S. PATENT DOCUMENTS

| | | | |
|---|---|---|---|
| 3,990,000 | 11/1976 | Digneffe | 323/24 |
| 4,307,331 | 12/1981 | Gyugyi | 323/210 |
| 4,382,223 | 5/1983 | Hedges | 323/242 |
| 4,426,614 | 1/1984 | Nola | 323/243 |
| 4,499,534 | 2/1985 | Schnetzka | 363/129 |
| 4,580,080 | 4/1986 | Smith | 323/243 |
| 4,580,088 | 4/1986 | Bloomer | 323/243 |
| 4,689,548 | 8/1987 | Mechlenberg | 323/243 |
| 4,956,762 | 9/1990 | Loveness et al. | 363/65 |
| 5,532,575 | 7/1996 | Ainsworth et al. | 363/44 |
| 5,828,561 | 10/1998 | Lavieville et al. | 363/62 |

FOREIGN PATENT DOCUMENTS

| | | | |
|---|---|---|---|
| 2 285 523 | 7/1995 | United Kingdom | H02M 1/00 |
| 96/14686 | 5/1996 | WIPO | H02M 7/48 |

*Primary Examiner*—Peter S. Wong
*Assistant Examiner*—Bao Q. Vu
*Attorney, Agent, or Firm*—Kirschstein, et al.

[57] ABSTRACT

A control arrangement for a multilevel convertor employs an AC reference signal which is locked to the AC system frequency and is compared with a number of DC threshold levels. Intersections of the reference signal and threshold levels triggers the firing and turning-off of GTOs within the convertor to produce the desired multilevel voltage output. Normal changes in system voltage, for example, are compensated by variation of the phase relationship of the reference signal with respect to the system voltage, and/or of the voltage values of the threshold levels. Sudden and drastic changes, especially reductions, in system voltage level are sensed and used to alter the amplitude of the reference signal so as to reduce the difference between the convertor multi-level voltage and the system voltage, thereby reducing the stress on the GTOs during faults.

25 Claims, 9 Drawing Sheets

PRIOR ART

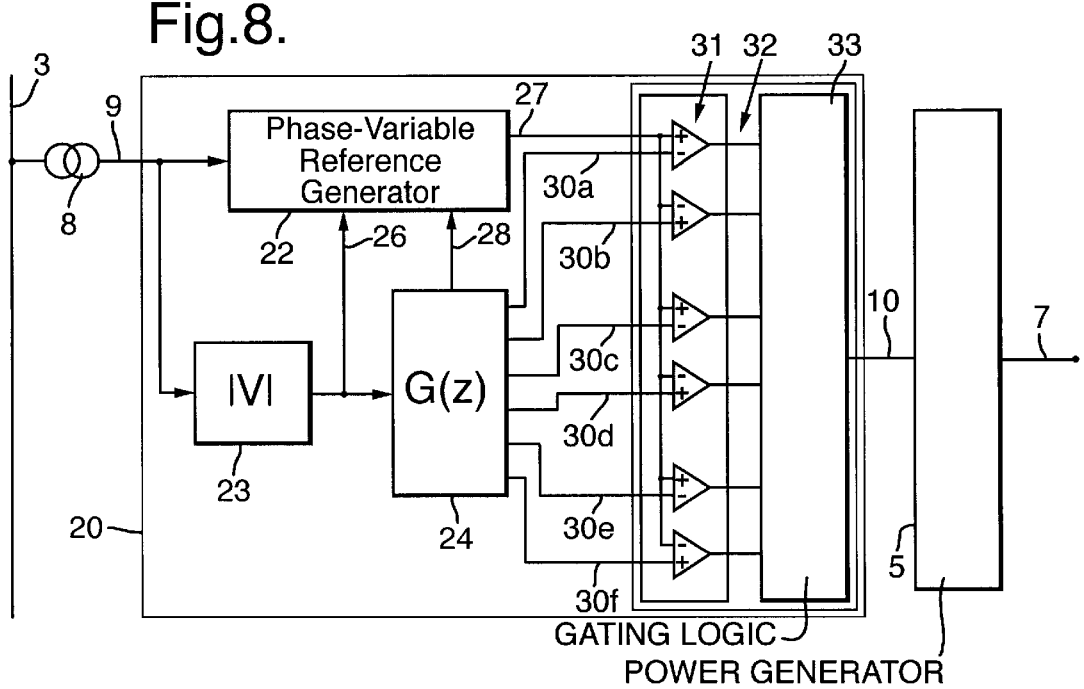
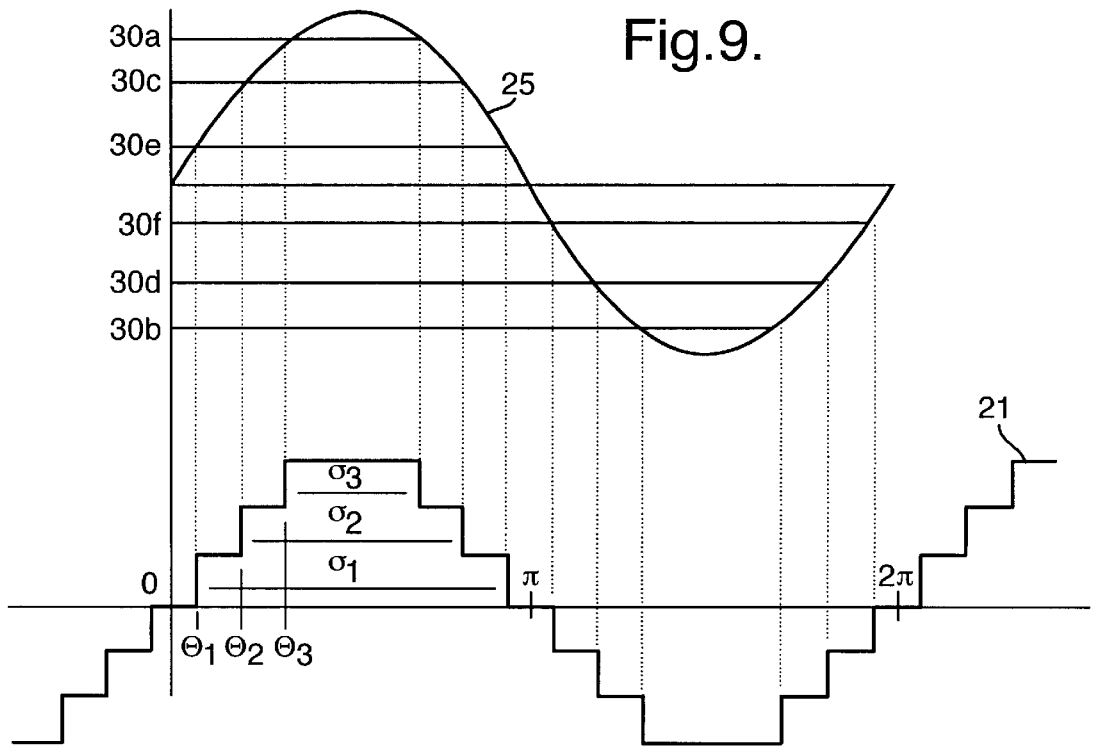

Fig.17(a).
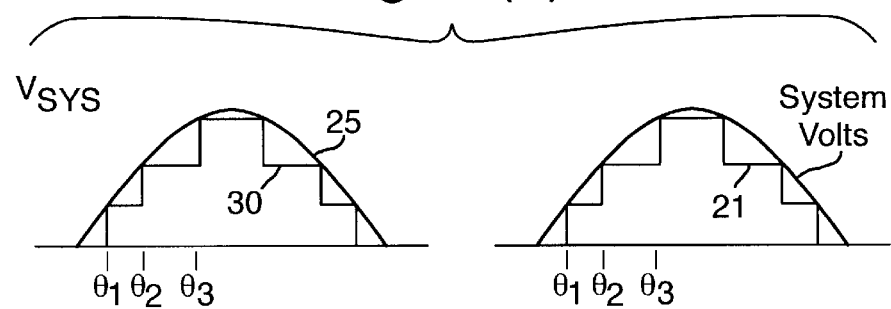
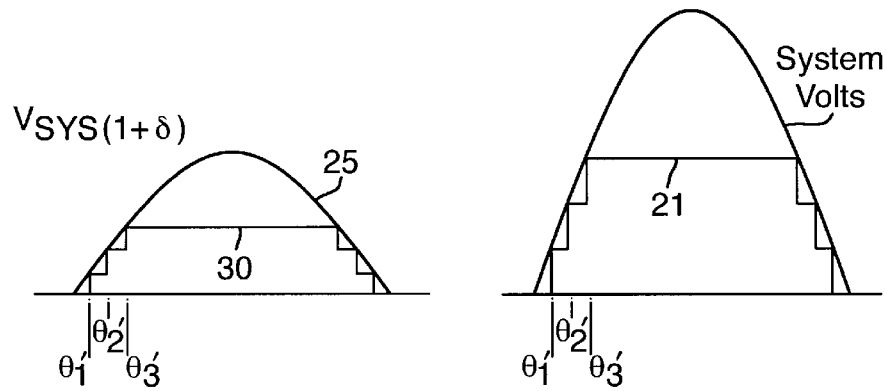
Fig.17(b).
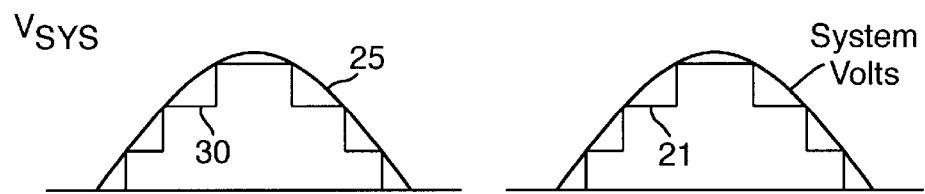
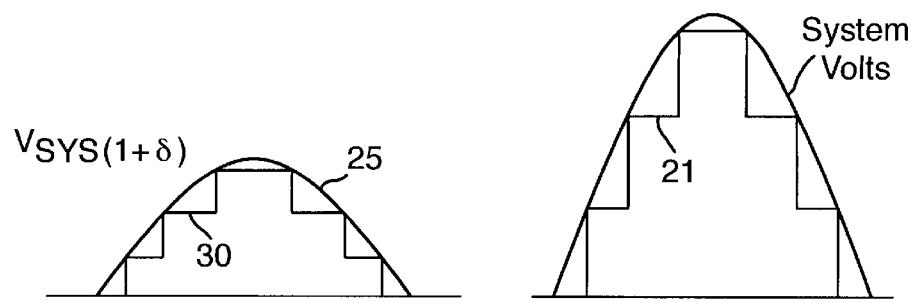

CONTROL ARRANGEMENT FOR A MULTILEVEL CONVERTOR

BACKGROUND OF THE INVENTION

The invention relates to a control arrangement for a multilevel convertor having a plurality of energy storage elements and a plurality of switching means, in particular, but not exclusively, such a multilevel convertor for connection to an AC system as a static var compensator (SVC).

Static var compensators are used in ratings typically from 1 MVar to 100 MVar or more in AC power transmission and distribution systems to control and stabilize AC voltage. These are devices normally connected in shunt to the AC system and can generate variable lagging or leading reactive current (or reactive volt-amperes—Vars) in dependence on a control system. Since the effective source impedance of an AC power system is almost always inductive, the AC voltage can thereby be changed, or alternatively it can, for example, be held constant in the presence of varying AC system load currents, by appropriate control of SVC current.

FIG. 1 shows an example of a typical arrangement as an SVC in elementary form for a single-phase system in which the AC source is represented as an equivalent of emf 1 behind a reactance 2 supplying a busbar 3. An attenuated version 9 of the voltage at busbar 3 is fed via a voltage transformer 8 to the control system 20. A load 4 is shown, and this may draw a varying current from busbar 3 such that the voltage of the latter varies. A power convertor 5 is shown connected in shunt to the busbar via a reactance 6. The control system 20 can, by suitable adjustment of the gating signals 10, change the convertor reactive current to effectively hold the voltage magnitude on busbar 3 constant, for example.

Alternative system arrangements and control functions other than constant voltage can also be implemented. For example, an SVC connected in shunt to the centre of a long transmission line connecting two AC generating systems can be controlled to change AC voltage, and consequently transmitted power, in such a manner as to dampen electromechanical oscillations and thereby stabilise the overall system.

Practical forms of SVC behave effectively as variable inductive or capacitive reactance, drawing variable reactive current but practically zero real current (neglecting SVC component losses). One well-known form of such a device is the thyristor-controlled reactor (TCR). Another is the force-commutated (voltage-source or current-source) convertor using electronic switching devices with turn-off capability; for high ratings these are normally gate-turn-off thyristors (GTOs). The SVC is then referred to as a GTO SVC.

The SVCs described above can be considered to comprise a variable reactive impedance connected in shunt to the AC system. It is also known to connect such a variable reactive impedance in series with a transmission line in an AC system, usually to interconnect two parts of the AC system, so as to improve system stability by control of AC system voltages. The general arrangement of this is shown in FIG. 2, in which one AC system is represented by emf 1 and impedance 2, the other similarly by emf 13 and impedance 12. The variable series impedance is shown as block 11.

The power converter block 5 is expanded in FIG. 3 to show possible power circuit connections to create a "multilevel circuit" using "H" bridges with which the control system of the present invention can be used. FIG. 3a shows the arrangement for a voltage-source convertor and FIG. 3b for a current-source convertor. Such a voltage-source convertor is the subject of the applicants'co-pending patent application GB 9422263.5. Multilevel circuits need a number of energy storage elements 14, which for the voltage-source convertor may be constituted by a capacitor or a battery, and for the current-source convertor may take the form of an inductor. Other more complex forms of energy storage element are also possible.

For the particular voltage-source convertor shown in FIG. 3a, each "H" bridge 15 has two AC terminals 16 and two DC terminals 17. Connected across the DC terminals 17 is, for example, a capacitor, and the three capacitors represented by the elements 14 can be connected in series in an appropriate switching pattern via switching elements 18, which may take the form of GTOs, to produce at the outer AC terminals 7, 35 of the convertor an AC waveform having a number of voltage levels equal to 2×(number of capacitors)+1, in this case 7. The waveform is therefore a stepped waveform which in most cases will be an approximation to a sine wave. Clearly, the greater the number of capacitors, the closer the sinusoidal approximation. The AC terminal 7 is connected to the AC system busbar via the inductor 6 (see FIG. 1).

The same principle applies to the current-source convertor shown in FIG. 3b, except that in this case the DC terminals of the "H" bridges are interconnected by inductors 13 and the bridges are connected not in series, but in parallel in the required switching sequence. This time the multilevel sinusoid is a current waveform which leads or lags the voltage on the busbar 3 by 90 electrical degrees.

A further example of a multilevel convertor which is suitable for control by the present invention is that which forms part of the subject-matter of an earlier co-pending patent application of the applicant, namely GB 9400285.4, which was published on Jul. 12, 1995.

The operation of a multilevel voltage-source convertor as an SVC is described with reference to FIG. 4. The convertor produces an almost sinusoidal voltage-source, $V_C$, made up of a number of nominally equal DC voltage levels and is approximately in phase with the AC system voltage, $V_S$. The coupling impedance L is usually the leakage reactance of a step-down transformer. By controlling the voltage $V_L$ across this inductance the SVC can vary the reactive current flow.

If $V_C$ and $V_S$ are in phase with each other, only reactive current can flow, as shown in the vector diagrams (a) and (b). In this case the magnitude of $I_L$ is proportional to the voltage difference $V_L$ between $V_C$ and $V_S$. If $V_L$ is zero, there is no current flow. The sign of $V_L$ determines whether $I_L$ is leading (capacitive), as in FIG. 4(a) or lagging (inductive), as in FIG. 4(b).

If a phase shift is introduced between $V_C$ and $V_S$, a component of real current will flow as shown in the vector diagrams (c) and (d). In this case the magnitudes of $V_C$ and $V_S$ are equal but there is a phase shift between them so only a component of real current flows. The magnitude of $I_L$ is proportional to the phase difference between $V_C$ and $V_S$ and the sign of this phase difference determines whether real current flows out of (FIG. 4(c)) or into (FIG. 4(d)) the convertor.

The capability to transiently exchange real current and hence power between the convertor and the AC system by introducing a phase shift between $V_C$ and $V_S$ is one means of controlling the level of SVC reactive current output. This is possible because, as the convertor cannot generate or absorb real current without the subsequent discharging or charging (respectively) of the capacitive storage elements, any real current flow will cause a change in the capacitor voltage levels and consequently a change in the reactive current output. Vector diagram (e) shows the case where there is both real and reactive power flowing through the convertor—in this case, the reactive power is inductive and real power flow is out of the convertor into the system.

Various methods of controlling the operation of switching devices are known, one of which is the zero-crossing detector. This was an early technique which related the instants at which the devices were fired to measurements with respect to the voltage zero crossings of the AC system to which the SVC was connected. An example is shown in FIG. 5, where α is the firing angle of a thyristor-controlled reactor (TCR). The reference waveform could be the actual measured voltage or the output of a phase-locked loop directly locked to the zero crossings of the measured voltage.

Another technique which was developed is Ainsworth's classic design of the phase-locked oscillator control system, illustrated in FIG. 6. FIG. 6 shows how this system is utilized for the control of a TCR. This is an indirectly phase-locked oscillator which generates firing instants from a half-cycle integral of the measured voltage, not from zero crossings, and is very stable. FIG. 7 shows the waveforms associated with this control system. Changes in firing instants occur if the integral of the error signal (the shaded areas in FIG. 7) changes.

Drawbacks are associated with these known control methods. In the first case, if the AC system to which the SVC is connected is a so-called weak system, i.e. one having a high series system inductance, the SVC could actually influence the zero crossings of the system itself with resultant instability of control. A problem with the second method mentioned, and which applies also to the zero-crossing method, is that control of the switching devices is slow. This means that, when AC system faults (e.g. short-circuits) occur, the switching devices used (e.g. GTOs) can be subjected to high transient overcurrents which can damage the devices.

It is an object of the present invention to provide a control system which can rapidly adapt to abnormal AC system conditions.

SUMMARY OF THE INVENTION

In accordance with a first aspect of the invention, there is provided a control arrangement for a multilevel convertor connected to an AC system, the convertor having a plurality of energy storage elements and a plurality of switching means, said energy storage elements and switching means being configured to enable an AC multilevel signal of N levels per cycle to be provided at output terminals of the convertor, the control arrangement comprising an AC reference signal generating means for generating an AC reference signal, a DC threshold level generating means for generating a plurality of DC threshold levels, and a comparator means connected to said reference signal generating means and to said threshold level generating means for the comparing of said threshold levels with said reference signal, said comparator means in use providing a plurality of drive signals for driving control inputs of said switching means such as to provide said convertor multilevel AC signal.

The control arrangement may comprise means for varying a phase of said reference signal with respect to a phase of the AC system voltage.

The phase varying means may comprise an error signal forming means having a first input for receiving a signal proportional to an AC system parameter to be controlled by the convertor and a second input for receiving a DC reference signal, and a phase-shift generator fed from an output of the error signal forming means, an output of the phase-shift generator providing, in use, said reference signal.

The reference signal generating means may comprise a phase-locked loop fed from the AC system and locked, in use, to the frequency thereof, and the phase-shift generator may comprise two multipliers fed, on the one hand, from respective quadrature outputs of said phase-locked loop and, on the other hand, from respective outputs of a sine generator and a cosine generator, said sine and cosine generators being fed from the output of said error signal forming means, said multipliers having respective outputs which are connected to respective inputs of a summing means, an output of said summing means providing, in use, a reference signal which is phase-shifted in proportion to a value of said error signal.

The reference signal generating means may comprise a filter arrangement fed from the AC system, and the phase-shift generator may comprise a variable phase-shift circuit fed from an output of the filter arrangement, said variable phase-shift circuit having a control input fed from the output of the error signal forming means, the variable phase-shift circuit providing, in use, a reference signal which is phase-shifted in proportion to a value of said error signal.

Said filter arrangement may be provided with quadrature outputs and said variable phase-shift circuit may comprise two multipliers fed, on the one hand, from respective said quadrature outputs of said filter arrangement and, on the other hand, from respective outputs of a sine generator and a cosine generator, said sine and cosine generators being fed from the output of said error signal forming means, said multipliers having respective outputs which are fed to respective inputs of a summing means, an output of said summing means providing, in use, a reference signal which is phase-shifted in proportion to a value of said error signal.

Said variable phase-shift circuit may comprise a delay means, in which a value of a delay is controlled by the output of said error signal forming means.

Said phase-locked loop may be arranged to provide quadrature outputs of a 1 per-unit amplitude level.

The control arrangement may comprise a signal regulating means for maintaining, during normal operating conditions, the AC reference signal at a 1 per-unit level. The signal regulating means may comprise a further multiplier and a reciprocating means, said further multiplier having a first input for receiving said reference AC signal and a second input connected to an output of said reciprocating means, said reciprocating means having an input for receiving a signal proportional to an amplitude of an AC system parameter to be controlled.

A limiting means may be included in the input circuit of the reciprocating means. The limiting means may be arranged to limit a range of a signal entering the reciprocating means to between 0.5 and 1.5 per-unit.

The control arrangement may comprise means for varying said threshold levels.

The threshold varying means may comprise an error signal forming means having a first input for receiving a signal proportional to an AC system parameter to be controlled by the convertor and a second input for receiving a DC reference signal, an output of said error signal forming means being connected to a plurality of threshold-forming means for providing respective said threshold levels, said levels, in use, varying in proportion to a value of said error signal.

The control arrangement may comprise means for varying an amplitude of said reference signal during abnormal operating conditions.

The amplitude varying means may comprise a further multiplier having a first input for receiving said AC reference signal and a second input fed from a further summing means, the further summing means having a first input for receiving said signal proportional to an AC system parameter to be controlled and a second input for receiving a DC offset reference, a multiplying constant having a selectable value of zero or unity being provided in a signal path of the second input of the further multiplier, the value of the multiplying constant being set, in use, to unity during said abnormal operating conditions.

Said second input of said further multiplier may be connected to an output of a further summing means, a first input of said further summing means being connected to an output of said reciprocating means, a second input of said further summing means being connected to an output of a dividing means, a first input of said dividing means being connected to an output of a yet further summing means, said yet further summing means having a first input for receiving said signal proportional to an AC system parameter to be controlled and a second input for receiving a DC offset reference, a second input of said dividing means being connected to said first input of said yet further summing means, multiplying constants having the oppositely selectable values of zero or unity being provided in respective inputs of said further summing means and being controlled, in use, such that variation in the amplitude of the reference signal from a 1 per-unit level takes place during said abnormal operating conditions.

A limiting means may be included in the signal path of said signal proportional to an AC system parameter. Said limiting means may be arranged to limit a range of a signal entering the divider and the yet further summing means to between 0.2 and 0.9 per-unit.

The threshold level generating means, in use, may generate N-1 threshold levels.

The signal proportional to an AC parameter to be controlled may, in use, be provided by a magnitude-generating means fed from the AC system. The magnitude-generating means may be a moving-average filter for providing an rms value of said parameter.

In accordance with a second aspect of the invention, there is provided a multilevel convertor comprising a control arrangement as described above.

The energy storage means may be voltage sources, such as capacitors or batteries, or current sources, such as inductors.

BRIEF DESCRIPTION OF THE DRAWINGS

Embodiments of the invention will now be described, by way of example only, with reference to the drawings, of which:

FIG. 8 is a schematic diagram of the main components of a control arrangement according to the present invention;

FIG. 9 is a waveform diagram corresponding to the control arrangement of FIG. 8;

FIG. 17 is a waveform diagram showing the behaviour under normal operating conditions of (a) an exclusively threshold-switching-time based control system, and (b) an exclusively phase-angle based control system;

DETAILED DESCRIPTION OF EMBODIMENTS OF THE INVENTION

Figure 1:
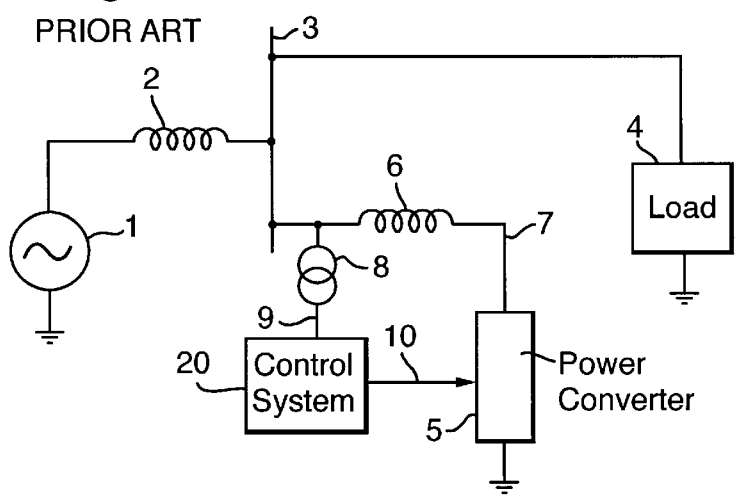
FIG. 1 is circuit diagram of a basic shunt SVC connection to an AC system according to the prior art.
Figure 2:
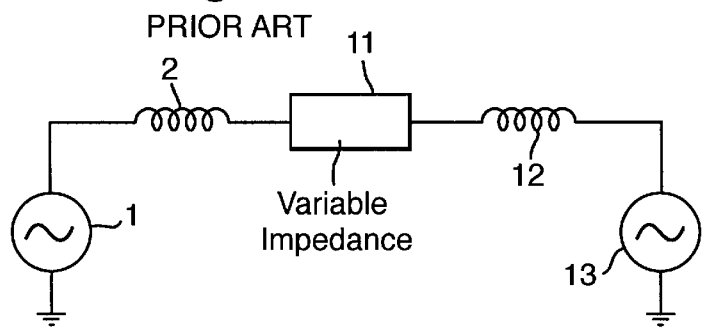
FIG. 2 is a circuit diagram of a series SVC connection between two AC systems according to the prior art.

Referring now to FIG. 8 in conjunction with FIGS. 1 and 9, the invention is described within the context of a single-phase multilevel SVC for the generation or absorption of reactive power in an AC system with the aim of regulating the AC voltage of the system.

The AC voltage on the busbars 3 is fed to a voltage transformer 8 and the secondary of the transformer 8 in turn supplies an AC sinusoidal voltage of a suitable amplitude to the control arrangement 20 on an input line 9. The control arrangement 20 uses the voltage on line 9 to generate gating signals 10 which switch the semiconductors of the power convertor 5 in such a way as to create the stepped waveform 21 (see FIG. 9) at the output 7 of the convertor 5.

The control arrangement 20 comprises three control blocks 22, 23, 24 which are combined to create the switching signals for the power convertor 5, as afore-mentioned. The control block 22 is a phase-variable reference signal generating means generating a sinusoidal reference voltage 25 (see FIG. 9) based on the transformed AC signal on the input 9 of the control arrangement 20. Control block 23 is a signal measurement block which converts the AC waveform on line 9 into a DC (in the steady state) voltage magnitude signal (e.g. representing the rms value of the system voltage) on an output 26. This output signal is then processed in a phase-shift/switching-angle demand block, which is the control block 24, and is also used to control the amplitude of the reference signal appearing on the output 27 of the control block 22.

The phase-shift/switching-angle demand block 24 provides two output signals, one on an output 28, which controls a phase shift to be undergone by the reference signal on output 27 relative to the system waveform on line 9, the other on a series of outputs 30a–30f, which establish a series of thresholds, in this case three (both positive and negative with respect to zero), taken to respective first inputs of a corresponding series of comparators 31. Second inputs of the comparators 31 are fed with the reference AC signal at output 27 of the control block 22.

The comparators 31 act to produce at their respective outputs a series of switching signals 32 which, via appropriate gating logic 33, drive the control inputs of the switching elements (e.g. GTOs) in the convertor 5 to produce a multilevel convertor output waveform 21 which reproduces as closely as possible the controlled reference waveform 25, though not, of course, its absolute magnitude. The gating logic 33 employs combinatorial and memory latch elements in a manner which would be readily apparent to the person skilled in the art of power convertor design having reference to the nature of the convertor being employed in a particular instance. Suitable GTO switching schemes for the SVCs dealt with in the co-pending applications mentioned earlier are disclosed in those applications.

The demand block 24 provides three basic methods of control action: by changing the phase-angle demand 28, by changing the threshold levels 30a–30f, or both. The initial DC values of the levels 30a–30f are chosen to set the default firing angles $\theta_1$, $\theta_2$, $\theta_3$ (see FIG. 9) which are necessarily different for each level. Any subsequent changes in threshold level will clearly give rise to a corresponding change in $\theta$.

Figure 10:
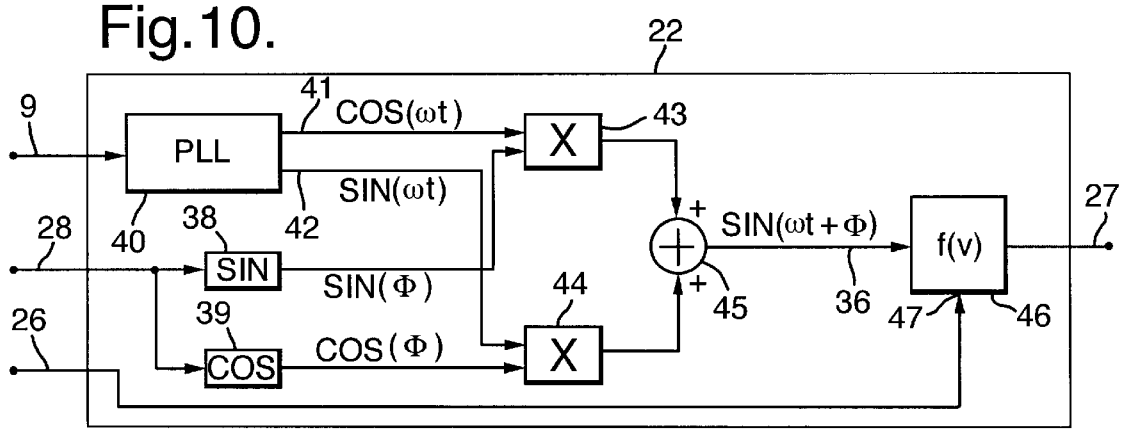
FIG. 10 is a first realization of a reference signal generating means employed in an embodiment of the invention.

One realization of the AC reference signal generating means 22 is shown in FIG. 10. This realization is based on the use of a phase-locked loop (PLL) 40 which is locked to the AC system voltage via the input line 9 and delivers two quadrature outputs 41, 42, both of a 1 per-unit (p.u.) amplitude. Phase-variability of the PLL output is achieved by means of the complex Fourier technique shown in the Figure. Thus, two multipliers 43, 44 receive the respective PLL output signals on one of their inputs, while their other input is fed with signals representing the sine and cosine, respectively, of the phase-shift demand signal on line 28. The sine and cosine values are formed by sine and cosine converters 38, 39, respectively. The multiplier outputs are summed in a summing means 45, the sum signal being then taken to the input of a voltage scaling block 46. Voltage scaling block 46 receives on a control input 47 the signal on line 26 which represents the magnitude of the AC system voltage, and delivers on line 27 the phase-variable reference signal 25 (see FIG. 9). The precise function of block 46 will be explained later.

The complex Fourier method just described is based on the trigonometric relationship:

sin ($\omega t$)·cos $\phi$+cos ($\omega t$)·sin $\phi$=sin ($\omega t$+$\phi$).

Figure 11:
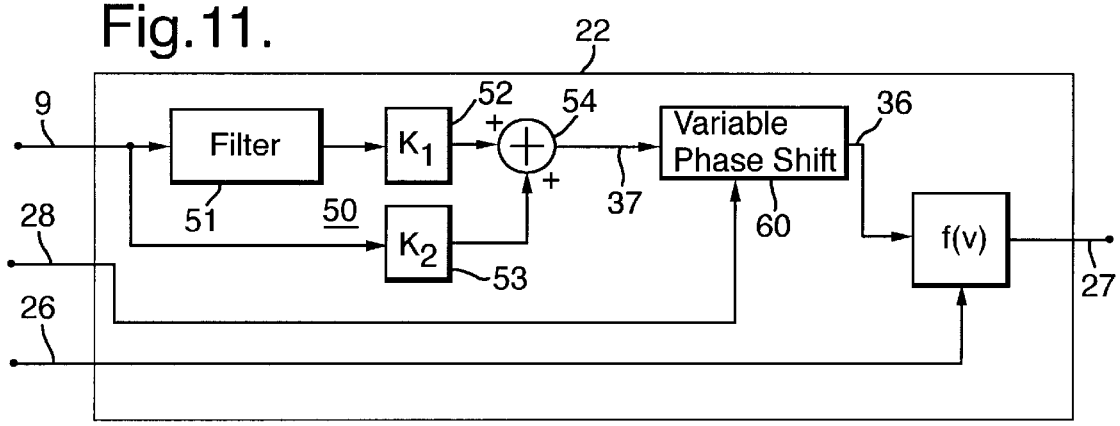
FIG. 11 is a second realization of a reference signal generating means employed in an embodiment of the invention.

An alternative realization of the reference signal generating means 22 is illustrated in FIG. 11. In this case the reference signal is derived directly from the transformed AC system voltage on input 9 and may for that reason be termed an "image tracking" technique. The signal on input 9 is first taken to a filter arrangement 50 and thence to a variable phase shift circuit 60, which performs the same function as the complex Fourier scheme described in connection with FIG. 10.

The filter arrangement 50 consists of two parallel paths, the first comprising a filter 51, which is preferably digitally implemented, followed by a multiplier 52, which multiplies its input signal by a factor $K_1$, and the second path comprising only a multiplier 53, which multiplies its input signal by a factor $K_2$. The factors $K_1$ and $K_2$ obey the rule $K_1+K_2=1$. The outputs of the multipliers 52, 53 are summed in a summing means 54, the summed output being then subject to a phase shift according to the phase-shift demand on line 28.

The control system is designed to operate on any practical AC system and remain stable in the presence of resonances, particularly those between weak AC systems and any fixed SVC capacitance.

The filter arrangement 50 is designed to produce a tracking waveform that is free from any unwanted steady-state harmonics but at the same time has a near instantaneous response to voltage transients that occur during AC system faults.

Some degradation of transient performance will occur with the inclusion of any filter arrangement. The addition of multiplying factors $K_1$ and $K_2$ allows for a dilution of the filtering effect depending upon the known value of SVC capacitance and any prior knowledge of the AC system.

For example, if the SVC is connected to an infinite bus (a "strong" AC system), $K_1$ is 0 and $K_2$ is 1. On a weak AC system resonant with the SVC capacitors, $K_1=1$ and $K_2=0$. However, the multiplying factors $K_1$ and $K_2$ can be set to any value between 1 and 0 so as to match the strength of the particular AC system involved.

Figure 12:
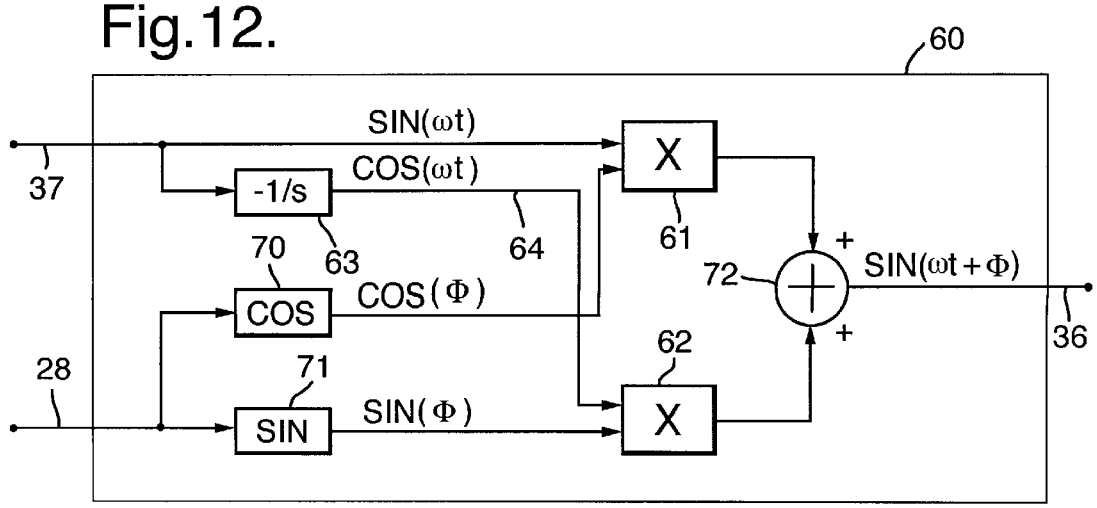
FIG. 12 is a first realization of a variable phase shift circuit employed in the reference signal generating means of FIG. 11.

The variable phase shift circuit 60 can be implemented as shown in FIG. 12. This technique is essentially the same as the complex Fourier technique for providing the phase shift in the reference signal generating means (FIG. 10). In this case, however, the quadrature signals needed for the multipliers 61, 62 in the circuit are not already present at the output of the summing means 54, but are generated by the inclusion of a negative integrating function 63 in the line 64 feeding one of the multipliers.

Note that, as $\phi$ is generally small for GTO SVC applications (<10°), the weighting functions cos $\phi$ and sin $\phi$ will be such that the phase-shifted reference signal entering the voltage scaling block 46 is dominated by the sin $\omega t$ component, so that any sudden phase or amplitude changes in the signal entering the variable phase shift circuit, caused for example by system disturbances, are substantially reflected in the AC reference signal. This allows fast tracking of the transformed AC system voltage on line 9 by the control arrangement, thereby restricting transient overcurrents or overvoltages within the convertor.

Figure 13:
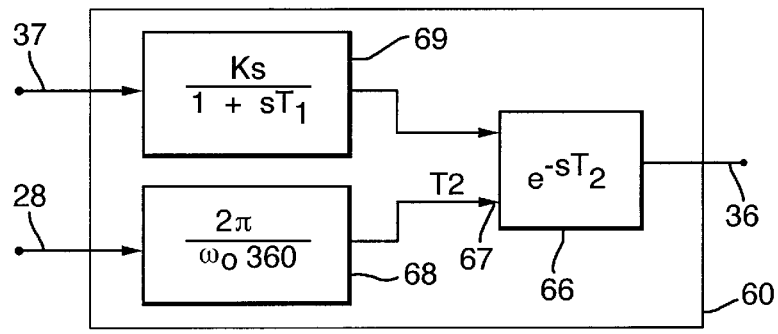
FIG. 13 is a second realization of a variable phase shift circuit employed in the reference signal generating means of FIG. 11.

A second method for deriving the phase shift in the reference generating means shown in FIG. 11 is to employ a delay function. This is illustrated in FIG. 13, in which the signal entering the variable phase shift circuit on input 37 is applied to the time delay circuit 66. The time delay circuit 66 also receives a signal on a control input 67, this signal determining the magnitude of the delay period $T_2$. A function 68 is included in series with the input 28 which provides a scaling of the AC waveform period for the time-delay control. A phase-lead function 69 is also included in the input line 37 in order to provide a small phase lead in the other input to the delay circuit 66. Thus now, if the phase-demand input range on line 28 is typically 20° and the phase lead supplied by the phase-lead circuit 69 is 10°, the phase-shifted reference signal at the output of the delay circuit 66 can be varied between ±10° with respect to the signal at the output of the filter arrangement 50, i.e. the signal on line 37.

Figure 14:
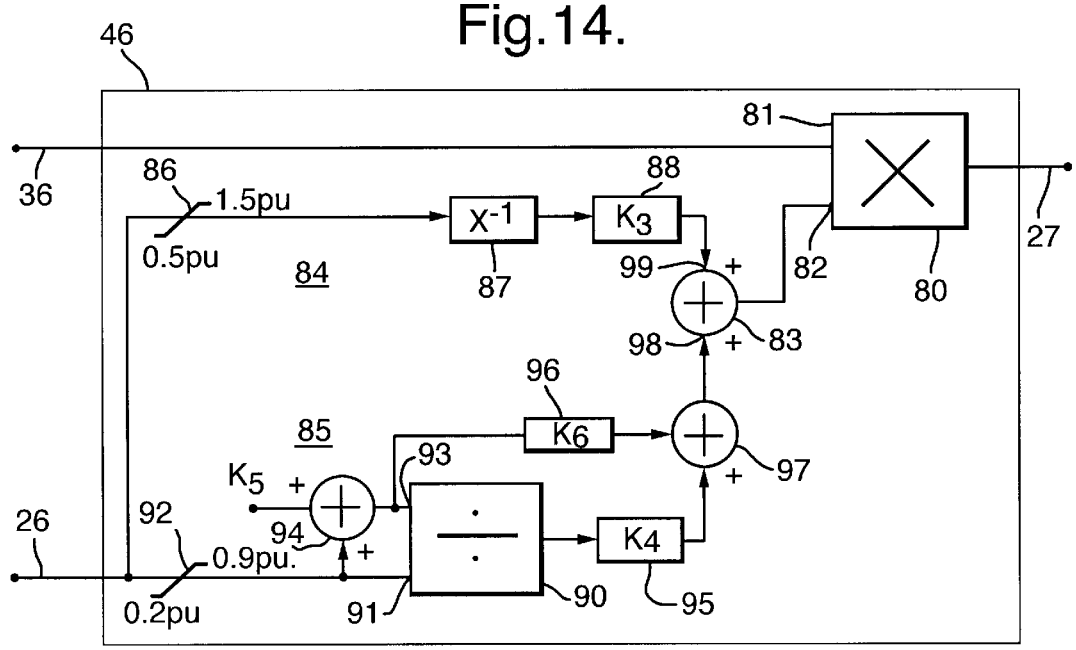
FIG. 14 is a circuit diagram of a voltage scaling means employed in an embodiment of the invention.

The voltage scaling block 46 is shown in more detail in FIG. 14. The voltage scaling function is divided into two parts: a steady-state voltage regulating part for maintaining the AC reference signal at a 1 per-unit level during normal operation of the convertor, i.e. during normal load fluctuations, for example, and a reference-signal varying part for varying the level of the reference signal during gross system disturbances such as occur during AC system faults.

The particular realization of the block 46 shown in FIG. 14 comprises a multiplier 80 receiving on a first input 81 the variable-phase output of the complex Fourier arrangement of FIG. 10 or the equivalent output of the variable phase shift circuit 60 of FIG. 11, and on a second input 82 the sum, via a summing means 83, of two parallel paths 84, 85.

Path 84, which regulates the steady-state amplitude of the AC reference signal, comprises a limiter 86 feeding a reciprocating means 87, which in turn feeds a multiplier 88. The muliplier 88 multiplies the signal at its input by a factor $K_3$. This path, along with the second path 85, is supplied by the signal on line 26 representing the magnitude of the AC system voltage.

Path 85 is based around a dividing means 90 whose first input 91 receives the signal on line 26 limited in a limiter 92 and whose second input 93 is connected to the output of a summing means 94. One input of the summing means 94 is connected to the input 91 of the dividing means 90, while the other input of the summing means 94 receives a DC reference level $K_5$. The output of the dividing means 90 is taken to a multiplier 95 which multiplies the signal at its input by a factor $K_4$. A further multiplier 96, which involves a factor $K_6$, is connected between the input 93 of the dividing means 90 and one input of a summing means 97. The other input of the summing means 97 is connected to the output of the multiplier 95. Finally, the output of the summing means 97 is connected to one input 98 of the summing means 83, while the output of the muliplier 88 is connected to the other input 99 of the summing means 83.

The operation of the voltage scaling function is explained in detail later.

Figure 15:
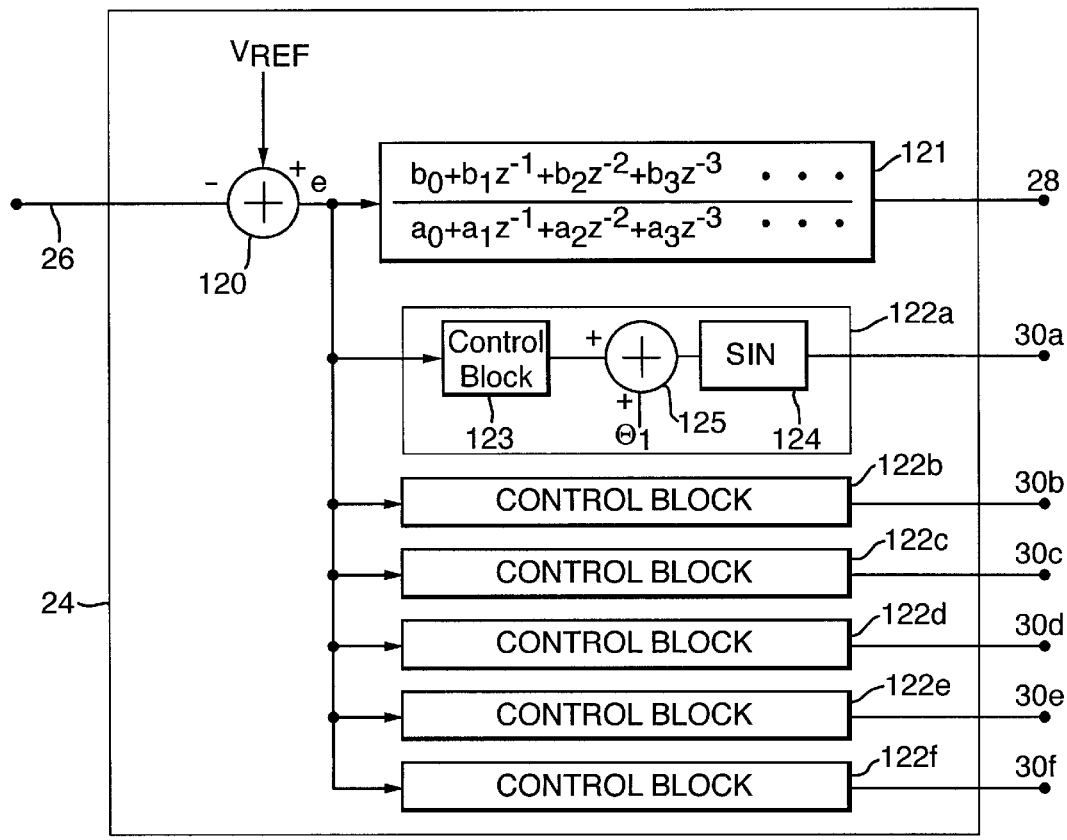
FIG. 15 is a circuit diagram of a phase-shift/switching angle demand function block as employed in an embodiment of the invention.

The composition of the phase-shift/switching angle demand block 24 is shown in FIG. 15. In FIG. 15 a difference means 120 receives on a negative input the AC system voltage magnitude signal on line 26 and on a positive input a DC voltage reference level $V_{REF}$. Appearing on the output of the difference means 120, when the control system is in operation, is an error signal e which is used, on the one hand, to provide the phase demand signal on line 28 and, on the other hand, to provide the threshold levels 30a–30f. In each of the lines 28 and 30a–30f there is a respective control block 121, 122a–122f, which in the case of the block 121 may take the form of a proportional function (P), a proportional-plus-integral function (PI), or a proportion-plus-integral-plus-derivative function (PID). In the preferred embodiment, this function is simply a proportional control. Block 121 shows a generalized representation of such a control function.

The control blocks 122a–122f consist of a block 123 such as that shown as 121 plus also a voltage reference representing an angle input value $\theta_N$ (see FIG. 9) and a sine converter function 124. A summing means 125 sums the output of the control block 123 and the angle input reference $\theta_N$, $\theta_N$ functioning as a default value of firing angle in each case, and the output of the summing means 125 is converted into a sine value by the sine converter 124. The value of the reference voltage $\theta_N$ is different for all the thresholds.

The control blocks 121, 122a–122f may be implemented in either analogue or digital form.

Figure 16:
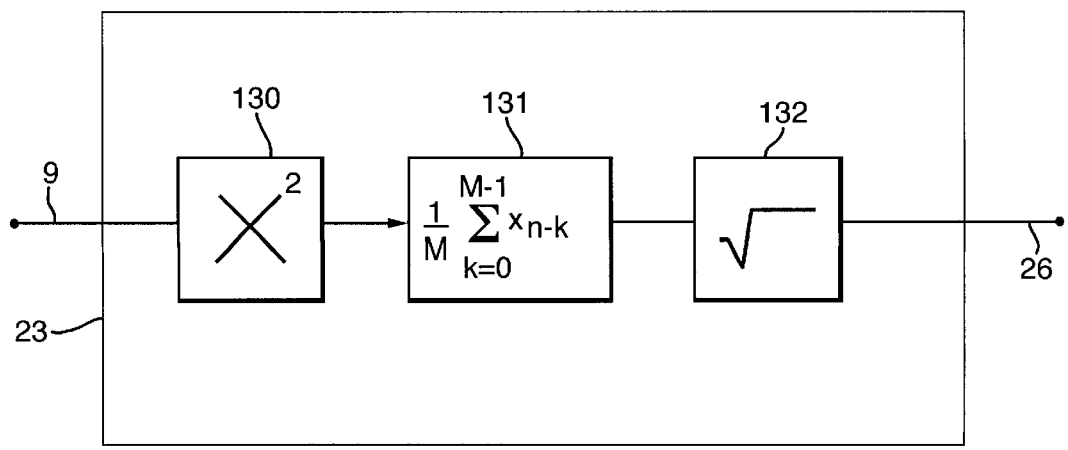
FIG. 16 is a realization of a measurement block as employed in an embodiment of the invention.

Finally, an embodiment of the AC measurement block 23 is shown in FIG. 16. As already mentioned, this block has the function of providing a DC value representing a particular magnitude of the AC system voltage. To achieve good control performance, it is important that this measurement operation be performed with minimum delay. The way this is done in the embodiment shown in FIG. 16 is to employ a known moving-average filter technique. This consists in the steps of taking a number of samples of the input voltage on line 9 over each cycle, forming the square of each of these samples, e.g in a multiplier 130 having commoned inputs, taking then the average of these squared samples (131), which is updated as new samples enter a window containing existing samples, those samples within the window being used for the averaging process, finally extracting the square root of the averaged result in a square-root block 132. The result is the rms (root mean square) value of the transformed system voltage.

If the moving-average filter is phase/frequency locked to the AC system waveform on line 9, i.e. if there is an integer number of samples per fundamental frequency cycle, say 40 samples, then the ripple due to the fundamental frequency component (and all other integer harmonics) is zero. This important characteristic of the moving-average filter is of great benefit in the control of AC power systems, as a fast ripple-free measurement of AC quantities is provided.

Other implementations of the measurement block 23 are possible. Thus, the signal on input 9 may alternatively be rectified, which will remove the fundamental frequency of the system waveform.

The operation of the control arrangement will now be described.

The voltage reference $V_{REF}$ (see FIG. 15) is set to a value which corresponds to a 1 per-unit value of AC system voltage for the particular AC system with which the control arrangement is being used. Assuming now that the "image tracking" reference signal generating means of FIG. 11 is being used, and that there is no large disturbance on the AC system, $K_3$ is set to unity and $K_4$ and $K_6$ are both set to zero (see FIG. 14). This means that path 84 in FIG. 14 is the only path that is active, path 85 being suppressed by the zero multiplying factors $K_4$ and $K_6$.

The task of path 84 is to ensure that, under normal operating conditions, the reference voltage on line 27 has a constant 1 per-unit (p.u.) value. This is because, under normal operating conditions, it is necessary for the gating signals feeding the GTOs in the convertor to bear a given temporal relationship to each other, i.e. the value of θ (see FIG. 9) for each threshold level 30a–30f must be a certain value corresponding to a certain loading on the system. This means that the intersections of the reference signal 25 with the threshold levels 30a–30f (see FIG. 9) must be fixed under normal conditions for a nominal loading on the system, and this in turn requires an AC reference signal of known amplitude. To achieve this, the voltage on input 81 of the multiplier 80 is multiplied by the reciprocal of the input voltage on line 26 by way of reciprocating means 87. Thus, assuming the 1 p.u. system voltage (looked upon as an absolute voltage value) for a given system is, say, 0.8 times the "average" 1 p.u. system voltage (again, seen as an absolute value), which without path 84 would give rise to an AC reference signal of 0.8 p.u. on line 27, with the aid of path 84 the reference signal level is restored to 1 p.u. (the correct absolute value), as required. A similar process occurs when the system voltage is greater than the "average" expected value.

The limiter 86 limits the voltage entering the reciprocating means 87 to between 0.5 and 1.5 of the anticipated "average" value of system voltage.

Under these steady-state conditions, the error signal e in the demand function block 24 (see FIG. 15) acts to adjust either the phase angle φ, or the angle θ, or both to maintain a magnitude of the system voltage which is substantially equal to the reference voltage $V_{REF}$ on the difference means 120. This is illustrated in FIG. 17, where FIG. 17(*a*) shows the behaviour for a θ-only control system and FIG. 17(*b*) the equivalent behaviour for a φ-only control system.

The upper line of FIG. 17(*a*) shows the situation for a 1 p.u. system voltage, in which the reference AC signal 25 is at its required 1 p.u. level and the threshold levels 30*a*–30*f* switch in and out at values $\theta_1$, $\theta_2$, etc, giving rise to GTO gating times $\theta_1$, $\theta_2$, etc. Assuming now the system voltage rises from its 1 p.u. level to a new level 1+δ higher than 1 p.u. (see lower line of FIG. 17(*a*), righthand graph, in which δ is deliberately exaggerated for the sake of clarity), the error signal at the output of the difference means 120 adjusts the threshold levels 30*a*–30*f* downwards such that they intersect the 1 p.u. AC reference signal 25 at times corresponding to the convertor output waveform 21 in the righthand graph of the lower line, i.e. at times $\theta_1'$, $\theta_2'$, etc. Thus, the area under the convertor output waveform increases and compensates for the rise in system voltage. The change in convertor GTO firing times is, in this example, such as ensure that reactive power flows from the system to the convertor, in order to achieve downward regulation of the system voltage. The reverse process occurs where there is a decrease in system voltage. Note that in this process the peak convertor output voltage, indeed the convertor voltage levels themselves, remains the same.

FIG. 17(*b*) shows the situation for a control system in which control of system voltage is carried out exclusively by varying the phase angle φ. In this case the waveforms are exactly the same as those in FIG. 17(*a*), except that this time the values of θ remain the same at all times, but the convertor output-voltage levels (see waveform 21) increase. This is due to the fact that, by varying φ, real power passes from the system to the convertor and increases the charge on the capacitors in the convertor, thereby increasing the DC voltage across each capacitor. As in the previous example, adjustment of the convertor voltage waveform is such as to ensure downward regulation of the system voltage.

Assume now that the AC system suffers a disturbance, e.g. a short-circuit, so that the system voltage drops to a low level, e.g. 0.3 p.u. This large drop in voltage is sensed by the measurement block 23 (see FIG. 8)—or alternatively it could be sensed by a current transformer (not shown) in one of the power lines—and the multiplying factor $K_3$ (see FIG. 14) is consequently set to 0 while $K_4$ is set to 1. $K_6$ remains at zero. Under these circumstances control passes from the path 84 in the voltage scaling means 46 to path 85 and the voltage entering input 82 of multiplier 80 is equal to that at the output of the dividing means 90. This voltage is ($K_5$+0.3 p.u.)÷0.3 p.u. Hence, since the voltage on the input 81 of the multiplier 80 equals 0.3 p.u., the voltage at the output of the multiplier 80 equals 0.3 p.u.+$K_5$. $K_5$ is set to an predetermined value, i.e. a value empirically determined for the particular coupling impedance to the AC system involved. A typical value may be 0.15. The result of this process is that the hitherto invariant AC reference signal 25 is decreased in amplitude to, in this example, 0.45 p.u. instead of 1 p.u. and consequently only the lower few threshold levels of both the waveforms 30*a*–30*f* and the convertor multilevel voltage 21 are used. The principle of this is illustrated in FIG. 18.

Figure 18:
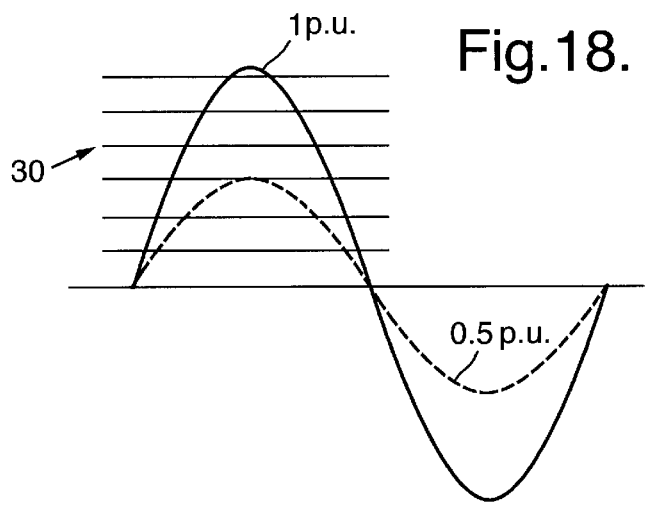
FIG. 18 shows the effect of reference signal reduction during gross system disturbances.

In FIG. 18 the behaviour of a 7-level multilevel convertor is shown (i.e. 7 levels per half-cycle) for both a 1 p.u. and a 0.5 p.u. AC reference voltage. It can be seen that the 1 p.u. voltage occupies all six threshold levels 30, whereas the 0.5 p.u. voltage, by virtue of the action of path 85 in the voltage scaling means, occupies only three of those levels. This achieves the desired reduction in convertor output voltage, as described above.

The limiter 92 (referring once more to FIG. 14) restricts the voltage on the input 91 of the dividing means 90 to within 0.2 and 0.9 p.u. in this particular embodiment.

When $K_4$=1 and $K_3$=0, as occurs during an AC system undervoltage, then in the embodiment shown the action of path 85 is not only to decrease the amplitude of the signal on line 27 from its normal 1 p.u. value, but also to increase it with respect to the signal on line 36. This has the effect that the voltage across the capacitors 14 in the "H" bridge links 15 (assuming now a voltage-source convertor such as that shown in FIG. 3(*a*) is being used) being brought into play will be reduced as power flows from the convertor to the AC system and will tend to reduce the voltage stress on those capacitors. This is to be preferred to arranging for the AC reference signal 25 to be reduced by the present control system to a level lower than the AC system fault voltage, in which case the fewer capacitors being utilised might be over-charged.

For overvoltages, all the capacitors of the bridge links 15 are automatically utilized so that the need to re-scale the tracking AC reference signal 25 is not as important as for the undervoltage condition. It should be noted that with the use of co-pending UK patent application 9400285.4 it is possible to maintain a balance between the link capacitor voltages as long as they are switched into the chain.

Where the PLL reference generating means of FIG. 10 is employed in place of the image-tracking technique of FIG. 11, the procedure must be slightly altered in order to cater for the fact that the reference signal is normally 1 p.u. anyway without the need for path 84 (FIG. 14). The multiplying constant $K_6$ comes into play in this respect, such that for normal "steady-state" operation (reference signal at 1 p.u.) $K_3$, $K_4$ and $K_6$ are all set to zero, allowing the already 1 p.u. reference signal to proceed unsealed to the line 27, but where severe reductions in system voltage occur and are sensed as described earlier in connection with the image-tracking reference signal generating method, $K_6$ is switched to a "1" value, $K_3$ and $K_4$ remaining at zero. Again, $K_5$ may be a value such as 0.15, depending on the particular coupling to the AC system in question. Now, with $K_6$ set to unity and assuming a short-circuit has caused a 0.3 p.u. magnitude level to appear on line 26 in FIG. 14, the signal on the input 81 of multiplier 80 is multiplied by a factor of $K_5$+0.3=0.45. This corresponds to the situation obtaining in the above-described "image-tracking" case.

Figure 3A:
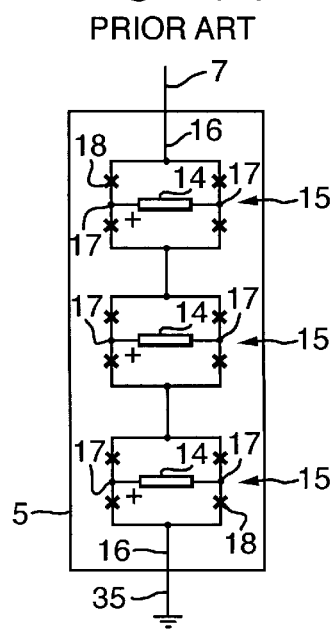
FIGS. 3(a), and 3(b) show two possible forms of a multilevel convertor according to the prior art for which the present invention is suitable.
Figure 3B:
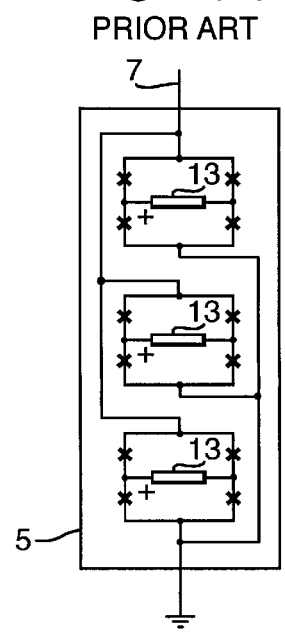
Figure 4:
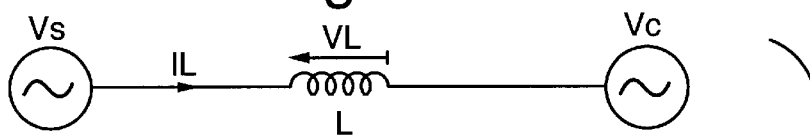
FIGS. 4 and 4(a) through 4(e) are a series of vector diagrams illustrating the basic operation of an SVC according to the prior art.
Figure 4A:
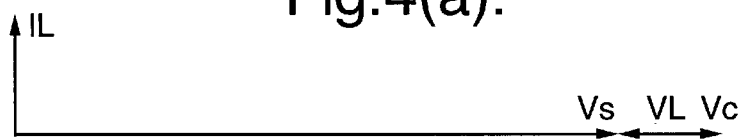
Figure 4B:
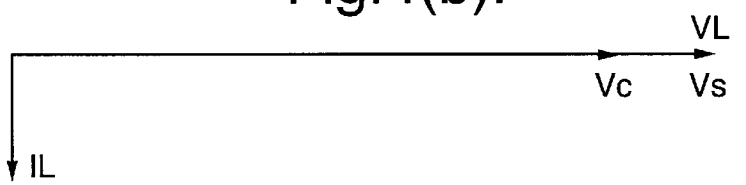
Figure 4C:
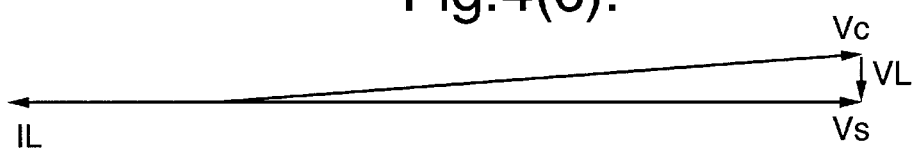
Figure 4D:
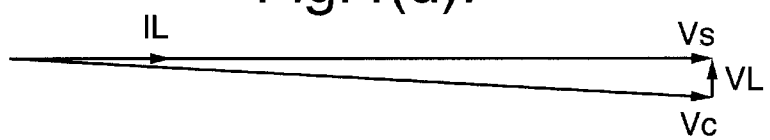
Figure 4E:
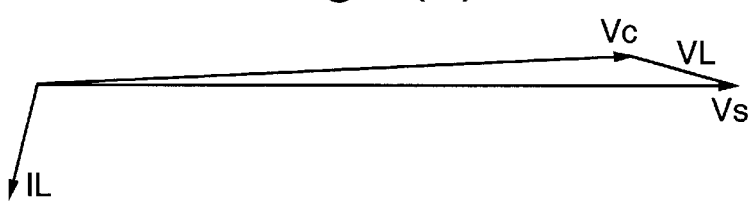
Figure 5:
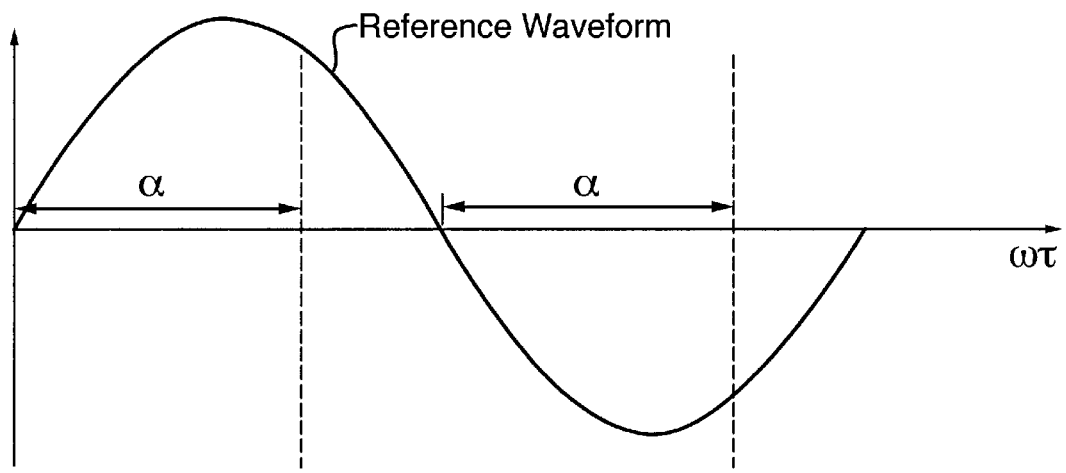
FIG. 5 is a waveform diagram for a zero-crossing control system according to the prior art.
Figure 6:
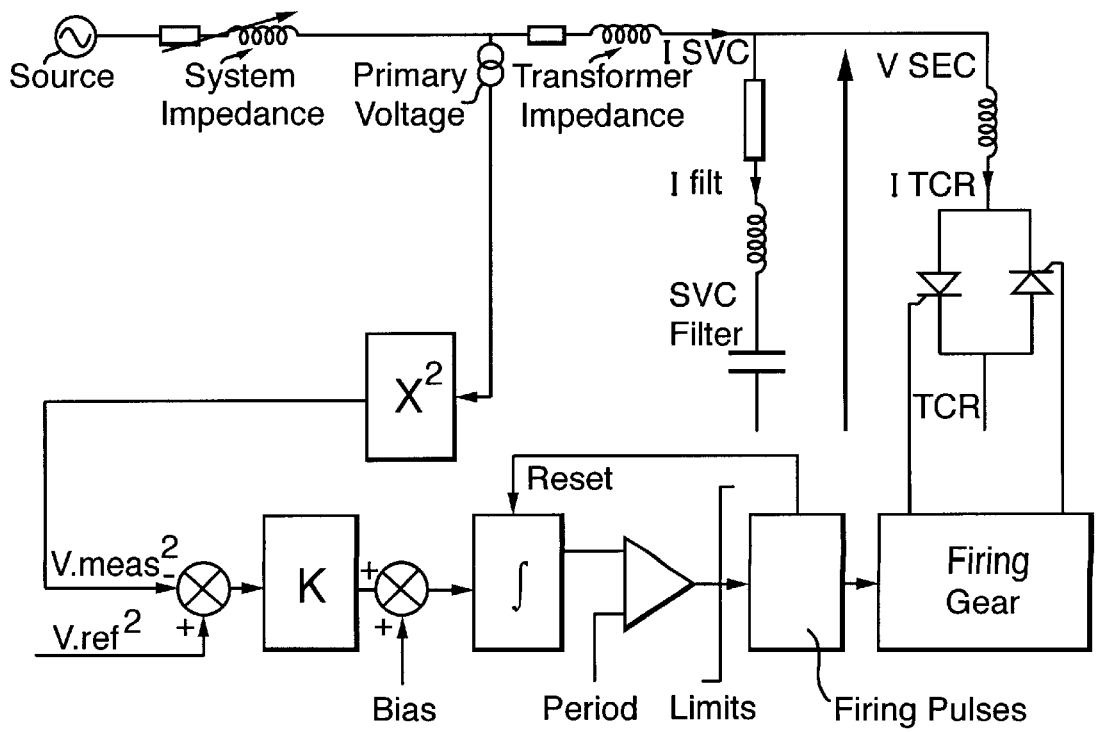
FIG. 6 is a schematic diagram of a phase-locked oscillator control arrangement for a TCR according to the prior art.
Figure 7:
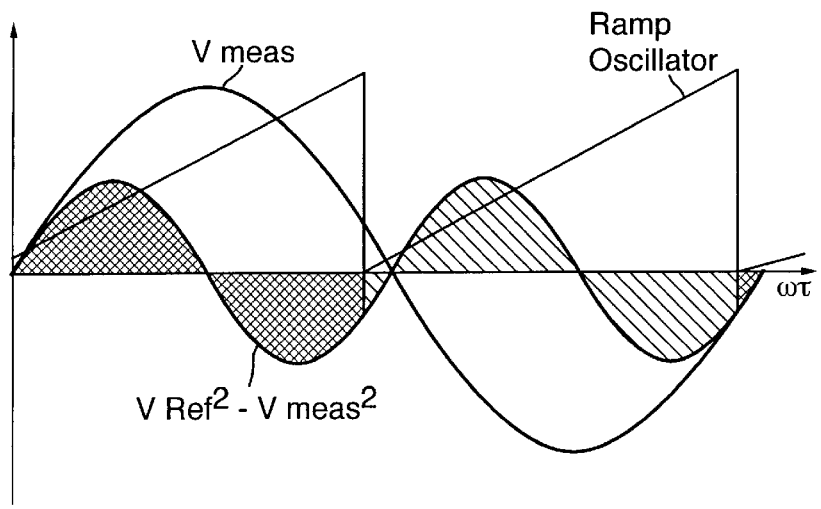
FIG. 7 is a waveform diagram corresponding to the control arrangement of FIG. 6 according to the prior art.
Figure 19:
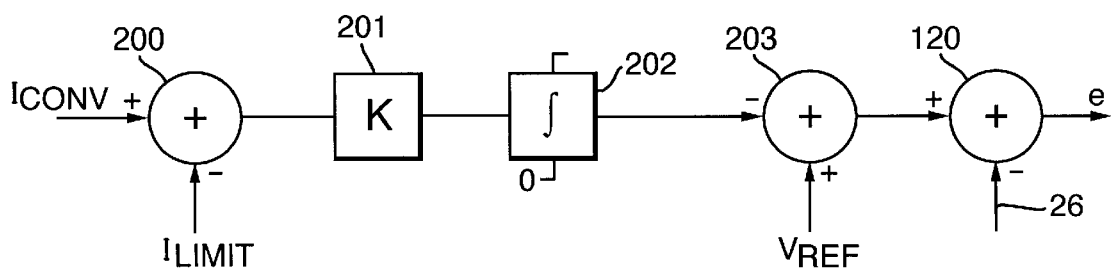
FIG. 19 is a circuit diagram of a current limiting control circuit for use with the invention.

In order to avoid the normal regulating effect of the error-signal producing means 120 in FIG. 15 striving to offset the AC reference signal reducing effect of path 85 in FIG. 14, which would result in unacceptable voltage and current levels in the convertor components, a current limit control arrangement is employed. This is shown in simplified form only in FIG. 19. In FIG. 19 a subtractor 200 receives on one input (the positive input) a signal representing the value of the current flowing through the convertor (where the convertor employed is a voltage-source arrangement as shown in FIG. 3(*a*), this current will be the series current flowing through whatever capacitors are in circuit) and on a second input (the negative input) a signal representative of a limit current level at which it is desired to limit the convertor current. The output of the subtractor 200 is fed to a multiplier 201 and thence to an integrator 202 which has a zero-voltage lower limit. The output of the integrator 202 is taken to the negative input of a further subtractor 203, the positive input of this subtractor being supplied by the $V_{REF}$ level shown in FIG. 15.

Whenever convertor current ($I_{CONV}$) is less than the limit value ($I_{LIMIT}$), which is the case during normal operation of the AC system, the output of the integrator 202 sits at zero volts and the reference voltage $V_{REF}$ is passed on unmodified to the error signal producing means, the subtractor 120 also shown in FIG. 15. However, when an undervoltage occurs on the AC system due to a fault and the normal regulating action of the error-signal producing means 120 comes into play, current in the convertor ($I_{CONV}$) increases and eventually reaches the limit value $I_{LIMIT}$ causing the integrator 202 to ramp upwards. The increasing output voltage of the integrator 202 backs off the normal $V_{REF}$ voltage on the subtractor 203 and the rate of rise of convertor current decreases. The output of the integrator settles to a level such as to give rise to a modified $V_{REF}$ voltage at the input to the subtractor 120 which ensures that the convertor current is at the limit level.

In practice two such control loops are employed, one for inductive current, one for capacitive. The output of the integrator in the second loop (not shown) is fed to the subtractor 203 as a second negative input.

While the control arrangement in accordance with the invention has been described in terms of single-phase connection to an AC system, in practice it can be employed in systems comprising any number of phases. In this case there will be one control arrangement such as shown in FIG. 8 for each phase. Also, although only three non-zero convertor levels have been used in the explanation of the invention, in practice the convertor may feature any number of levels.

It is stressed that the exact type of convertor used is transparent to the control arrangement, hence current-source convertors or Graetz bridge convertor topologies may also be employed in the system.

It is also envisaged that the AC reference signal generating means may provide as many separate AC reference signals as there are threshold levels, instead of just one common signal as heretofore described. By use of this measure, whereby the reference signals would feed respective inputs of the comparator means 31, it would be possible to vary the switching times of individual threshold levels in the convertor by varying the amplitude of only the associated reference signal. In this method, which is not described in more detail in this specification, the threshold levels would remain at a fixed value.

The limiting values shown in FIG. 14 in the paths 84 and 85 are typical values only and may differ from system to system.

We claim:

1. Control arrangement for a multilevel convertor connected to an AC system for regulating an AC voltage of the system, the convertor having a plurality of energy storage elements and a plurality of switching means, said energy storage elements and switching means being configured to enable an AC multilevel signal of N levels per cycle to be provided at output terminals of the convertor, the control arrangement comprising an AC reference signal generating means for generating an AC reference signal from the AC system voltage, a DC threshold level generating means for generating a plurality of DC threshold levels, and a comparator means connected to said reference signal generating means and to said threshold level generating means for comparing said threshold levels with said reference signal, said comparator means in use providing a plurality of drive signals for driving control inputs of said switching means such as to provide said convertor multilevel AC signal.

2. Control arrangement as claimed in claim 1, comprising means for varying a phase of said reference signal with respect to a phase of the AC system voltage.

3. Control arrangement as claimed in claim 2, in which said phase varying means comprises an error signal forming means having a first input for receiving a signal proportional to an AC system parameter to be controlled by the convertor and a second input for receiving a DC reference signal and a phase-shift generator fed from an output of the error signal forming means, an output of the phase-shift generator providing, in use, said reference signal.

4. Control arrangement as claimed in claim 3, in which the reference signal generating means comprises a filter arrangement fed from the AC system, and the phase-shift generator comprises a variable phase-shift circuit fed from an output of the filter arrangement, said variable phase-shift circuit having a control input fed from the output of the error signal forming means, the variable phase-shift circuit providing, in use, a reference signal which is phase-shifted in proportion to a value of said error signal.

5. Control arrangement as claimed in claim 4, in which said variable phase-shift circuit comprises a delay means, in which a value of a delay is controlled by the output of said error signal forming means.

6. Control arrangement for a multilevel convertor connected to an AC system for regulating an AC voltage of the system, the convertor having a plurality of energy storage elements and a plurality of switching means, said energy storage elements and switching means being configured to enable an AC multilevel signal of N levels per cycle to be provided at output terminals of the convertor, the control arrangement comprising:
 a) an AC reference signal generating means for generating an AC reference signal from the AC system voltage,
 b) a DC threshold level generating means for generating a plurality of DC threshold levels,
 c) a comparator means connected to said reference signal generating means and to said threshold level generating means for comparing said threshold levels with said reference signal, said comparator means providing, in use, a plurality of drive signals for driving control inputs of said switching means such as to provide said convertor multilevel AC signal,
 d) means for varying a phase of the AC reference signal with respect to a phase of the AC system voltage, said phase varying means including an error signal forming means having a first input for receiving a signal proportional to an AC system parameter to be controlled by the convertor, and a second input for receiving a DC reference signal, and a phase-shift generator fed from an output of the error signal forming means, said phase-shift generator having an output providing, in use, the AC reference signal,
 e) said reference signal generating means including a phase-locked loop fed from the AC system and locked, in use, to a frequency thereof, and
 f) said phase-shift generator including two multipliers fed, on the one hand, from respective quadrature outputs of said phase-locked loop and, on the other hand, from respective outputs of a sine generator and a cosine generator, said sine and cosine generators being fed from the output of said error signal forming means, said multipliers having respective outputs which are connected to respective inputs of a summing means, said summing means having an output providing, in use, a reference signal which is phase-shifted in proportion to a value of said error signal.

7. Control arrangement for a multilevel convertor connected to an AC system for regulating an AC voltage of the system, the convertor having a plurality of energy storage elements and a plurality of switching means, said energy storage elements and switching means being configured to enable an AC multilevel signal of N levels per cycle to be provided at output terminals of the convertor, the control arrangement comprising:

a) an AC reference signal generating means for generating an AC reference signal from the AC system voltage, b) a DC threshold level generating means for generating a plurality of DC threshold levels, c) a comparator means connected to said reference signal generating means and to said threshold level generating means for comparing said threshold levels with said reference signal, said comparator means providing, in use, a plurality of drive signals for driving control inputs of said switching means such as to provide said convertor multilevel AC signal, d) means for varying a phase of the AC reference signal with respect to a phase of the AC system voltage, said phase varying means including an error signal forming means having a first input for receiving a signal proportional to an AC system parameter to be controlled by the convertor, and a second input for receiving a DC reference signal, and a phase-shift generator fed from an output of the error signal forming means, said phase-shift generator having an output providing, in use, the AC reference signal, e) said reference signal generating means including a filter arrangement fed from the AC system, f) said phase-shift generator including a variable phase-shift circuit fed from an output of the filter arrangement, said variable phase-shift circuit having a control input fed from the output of the error signal forming means, said variable phase-shift circuit providing, in use, a reference signal which is phase-shifted in proportion to a value of said error signal, and g) a signal regulating means for maintaining, during normal operating conditions, the AC reference signal at a one per-unit level.

8. Control arrangement as claimed in claim 7, comprising a limiting means in the input circuit of the reciprocating means.

9. Control arrangement as claimed in claim 8, in which limiting means is arranged to limit a range of a signal entering the reciprocating means to between 0.5 and 1.5 per-unit.

10. Control arrangement as claimed in claim 1, comprising means for varying said threshold levels.

11. Control arrangement as claimed in claim 10, in which said threshold varying means comprises an error signal forming means having a first input for receiving a signal proportional to an AC system parameter to be controlled by the convertor and a second input for receiving a DC reference signal an output of said error signal forming means being connected to a plurality of threshold-forming means for providing respective said threshold levels said levels, in use, varying in proportion to a value of said error signal.

12. Control arrangement as claimed in claim 1, comprising means for varying an amplitude of said reference signal during abnormal operating conditions.

13. Control arrangement as claimed in claim 6, comprising means for varying an amplitude of said reference signal during abnormal operating conditions, said amplitude varying means comprising a further multiplier having a first input for receiving said AC reference signal and a second input fed from a further summing means, the further summing means having a first input for receiving said signal proportional to an AC system parameter to be controlled and a second input for receiving a DC offset reference, a multiplying constant having a selectable value of zero or unity being provided in a signal path of the second input of the further multiplier, the value of the multiplying constant being set, in use, to unity during said abnormal operating conditions.

14. Control arrangement as claimed in claim 7, in which said second input of said further multiplier is connected to an output of a further summing means, a first input of said further summing means being connected to an output of said reciprocating means, a second input of said further summing means being connected to an output of a dividing means, a first input of said dividing means being connected to an output of a yet further summing means, said yet further summing means having a first input for receiving said signal proportional to an AC system parameter to be controlled and a second input for receiving a DC offset reference, a second input of said dividing means being connected to said first input of said yet further summing means, multiplying constants having the oppositely selectable values of zero or unity being provided in respective inputs of said further summing means and being controlled, in use, such that a variation in the amplitude of the reference signal from a 1 per-unit level takes place during said abnormal operating conditions.

15. Control arrangement as claimed in claim 14, comprising a limiting means in the signal path of said signal proportional to an AC system parameter.

16. Control arrangement as claimed in claim 15, in which said limiting means is arranged to limit a range of a signal entering the divider and the yet further summing means to between 0.2 and 0.9 per-unit.

17. Control arrangement as claimed in claim 1, in which the threshold level generating means, in use, generates N-1 threshold levels.

18. Control arrangement as claimed in claim 1, in which, in use, the signal proportional to an AC parameter to be controlled is provided by a magnitude-generating means fed from the AC system.

19. Control arrangement as claimed in claim 18, in which the magnitude-generating means is a moving-average filter for providing an rms value of said parameter.

20. A multilevel convertor connected to an AC system for regulating an AC voltage of the system, the convertor having a plurality of energy storage elements and a plurality of switching means, said energy storage elements and switching means being configured to enable an AC multilevel signal of N levels per cycle to be provided at output terminals of the convertor, the convertor being connected to a control arrangement comprising an AC reference signal generating means for generating an AC reference signal from the AC system voltage, a DC threshold level generating means for generating a plurality of DC threshold levels, and a comparator means connected to said reference signal generating means and to said threshold level generating means for comparing said threshold levels with said reference signal, said comparator means in use providing a plurality of drive signals for driving control inputs of said switching means such as to provide said convertor multilevel AC signal.

21. Multilevel convertor as claimed in claim 20, in which said energy storage elements are voltage sources.

22. Control arrangement as claimed in claim 6 in which said phase-locked loop is arranged to provide quadrature outputs of a 1 per-unit amplitude level.

23. Control arrangement for a multilevel convertor connected to an AC system for regulating an AC voltage of the system, the convertor having a plurality of energy storage elements and a plurality of switching means, said energy storage elements and switching means being configured to enable an AC multilevel signal of N levels per cycle to be provided at output terminals of the convertor, the control arrangement comprising:

a) an AC reference signal generating means for generating an AC reference signal from the AC system voltage;

b) a DC threshold level generating means for generating a plurality of DC threshold levels, c) a comparator means connected to said reference signal generating means and to said threshold level generating means for comparing said threshold levels with said reference signal, said comparator means providing, in use, a plurality of drive signals for driving control inputs of said switching means such as to provide said convertor multilevel AC signal, d) means for varying a phase of the AC reference signal with respect to a phase of the AC system voltage, said phase varying means including an error signal forming means having a first input for receiving a signal proportional to an AC system parameter to be controlled by the convertor, and a second input for receiving a DC reference signal, and a phase-shift generator fed from an output of the error signal forming means, said phase-shift generator having an output providing, in use, the AC reference signal, e) said reference signal generating means including a filter arrangement fed from the AC system, f) said phase-shift generator including a variable phase-shift circuit fed from an output of the filter arrangement, said variable phase-shift circuit having a control input fed from the output of the error signal forming means, said variable phase-shift circuit providing, in use, a reference signal which is phase-shifted in proportion to a value of said error signal, and g) said filter arrangement including quadrature outputs, and said variable phase-shift circuit including two multipliers fed, on the one hand, from respective said quadrature outputs of said filter arrangement and, on the other hand, from respective outputs of a sine generator and a cosine generator, said sine and cosine generators being fed from the output of said error signal forming means, said multipliers having respective outputs which are fed to respective inputs of a summing means, said summing means having an output providing, in use, a reference signal which is phase-shifted in proportion to a value of said error signal.

24. Control arrangement as claimed in claim 7, in which said signal regulating means comprises a further multiplier and a reciprocating means, said further multiplier having a first input for receiving said reference AC signal and a second input connected to an output of said reciprocating means, said reciprocating means having an input for receiving a signal proportional to an amplitude of an AC system parameter to be controlled.

25. Multilevel convertor as claimed in claim 20, in which said energy storage elements are current sources.

* * * * *